United States Patent [19]

Jones

[11] 4,156,886

[45] May 29, 1979

[54] GAS TUBE SURGE ARRESTER

[75] Inventor: Raymond D. Jones, Cheam, England

[73] Assignee: TII Corporation, Lindenhurst, N.Y.

[21] Appl. No.: 788,755

[22] Filed: Apr. 19, 1977

[51] Int. Cl.[2] ............ H02H 3/22

[52] U.S. Cl. ............ 361/120; 313/306; 361/129

[58] Field of Search ............ 361/117, 118, 119, 120, 361/129; 313/258, 256, 244, 245, 246, 325, 306, 217, 231.1; 315/35, 36; 29/446

[56] References Cited

U.S. PATENT DOCUMENTS

| | | | |
|---|---|---|---|
| 3,289,027 | 11/1966 | Jones | 361/120 X |
| 3,388,274 | 6/1968 | Kawiecki et al. | 361/120 X |
| 3,791,711 | 2/1974 | Jonassen | 361/120 X |
| 3,885,202 | 5/1975 | Baker et al. | 361/117 |
| 3,914,849 | 10/1975 | Martin | 29/446 |

*Primary Examiner*—Patrick R. Salce
*Attorney, Agent, or Firm*—Morgan, Finnegan, Pine, Foley & Lee

[57] ABSTRACT

A three element gas filled tubular surge arrester is disclosed. The arrester has a hollow cylindrical mid-section or centerbody defining a first cylindrical electrode, and a pair of rod-shaped line electrodes extending inwardly into and along the axis of the centerbody from respective end caps to define respective annular gaps relative to the centerbody electrode as well as a gap between the opposed ends of the line electrodes. The end caps are electrically and mechanically connected to the line electrodes but insulated by annular insulator spacers from the centerbody. One of the line electrodes is partially hollow and apertured, and incorporates a pinch tube for exhaustion and subsequent filling of the tube interior with an ionizable gas.

Incorporated in this known design is an annular sleeve which lines the centerbody and is coaxial relative to the rod electrodes. The sleeve, which is of metallic composition, functions to improve the overload handling capacity of the arrester. Further, the insert improves the stability of the striking voltage.

6 Claims, 1 Drawing Figure

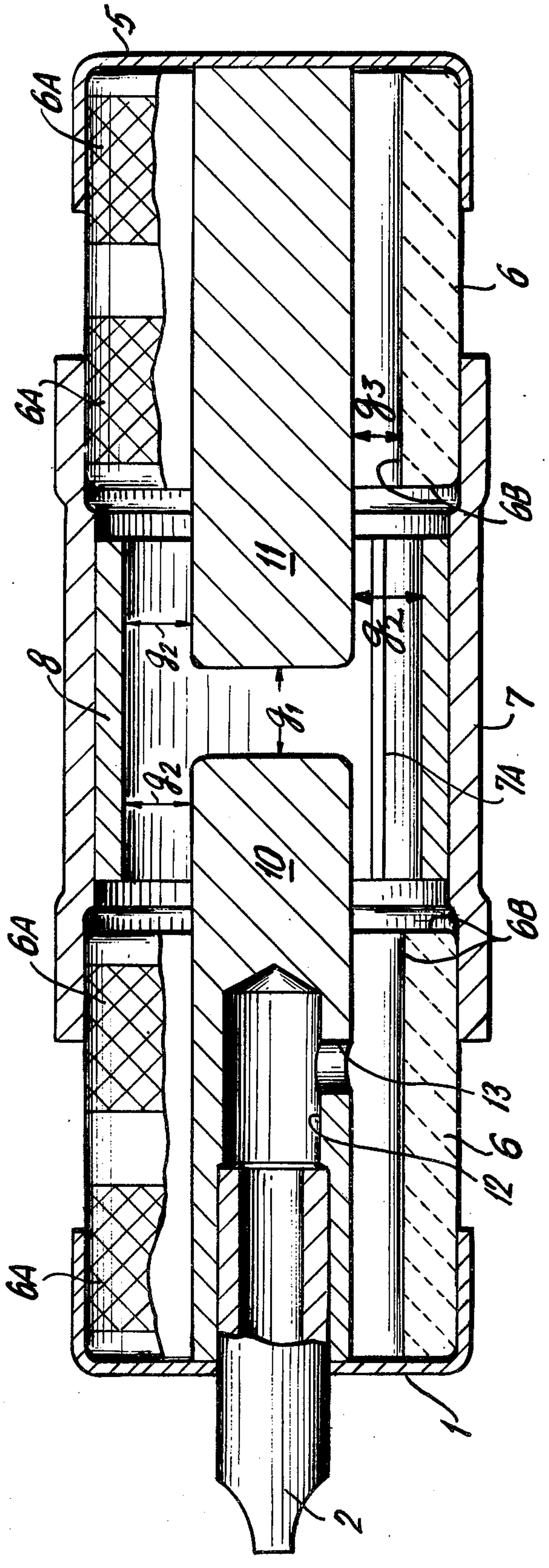

GAS TUBE SURGE ARRESTER

BACKGROUND AND OBJECTS

The three-electrode gas filled surge arrester is now widely used in the protection of telephone and other networks and equipment; see for example U.S. Pat. No. 3,289,027; current commercial types are exemplified by TII types 21 and 31 manufactured and sold by the assignee herein, TII Corporation (formerly Telecommunications Industries, Inc.).

As is well known, the performance of gas filled arresters depends among other things on gap dimensions, nature of the gas, and gas pressure. Typically, for a striking voltage of ca 400 volts, gas pressure is approximately 45 mm while the gap dimension between each electrode and the centerbody is in the order of 0.070", and between the faces of the line electrodes is about 0.065".

As with technology in general, there have been continuous efforts to improve the performance of the three element gas tube arrester, encouraged to some extent by constantly increasing stringency in the various municipal and institutional codes and regulations governing these elements.

With respect to one test which must now be passed as a condition to U.L. listing for safety under abnormal fault conditions, the gas tube is subjected to a current of 120 amperes for 1.2 seconds (being the fusible time of a bridle wire or equivalent fusible element).

Tests have indicated that some designs may encounter difficulty in meeting this test, the casing occasionally rupturing and the rupture being accompanied by a spray of molten material. It has been discovered that the rupturing depends on the behavior of the electrodes during overload. If the electrodes sag sufficiently to touch the centerbody, rupture is usually averted; otherwise, rupture is likely. In the former case a short circuit is established; in the latter high heat generating resistance prevails.

In devising means to meet these more stringent tests, it is strongly preferred, if not essential, that current commercial designs be subject to as little change as possible since such designs constitute proven, widely accepted arresters which meet many codes and regulations and are dimensioned to fit existing commercial mountings.

Various design changes based on these constraints, including lengthening of the electrodes and changes in the cavity of the electrode carrying the pinch tube alone, have not been considered to be entirely satisfactory solutions.

In contrast, the incorporation of a sleeve coaxially telescoped inside the centerbody electrode (the term sleeve as used herein also contemplates a thickening of the centerbody wall in the discharge region) provides a successful solution to the housing rupture problem. This change reduces gap dimensions thus requiring a compensating increase in gas pressure to maintain the previous breakdown potential. While these changes could conceivably prejudice other performance specifications, it has been found to the contrary that the changes actually provide an improvement in d.c. breakdown voltage stability.

To understand this result, it is noted that in some cases degradation of d.c. breakdown voltage occurs after a certain number of high current strikes. The drop is the result of the deposition of metal on the surfaces of the ceramic insulator rings which separate the centerbody from the end caps. This deposition occurs as a consequence of sputtering of the electrode metal in the low pressure inert gas atmosphere of the tube. In the designs of interest, the ceramic/electrode spacing is less than the annular gaps; with the ceramic coated with metal a shorter gap is thus established causing a drop in striking voltage. Such a drop may cause the arrester to fire in the presence of normal working potentials or signals, e.g., ringing voltages.

With the addition of the sleeve, the reduced annular centerbody/electrode gap more nearly approaches the ceramic/electrode spacing such that the d.c. breakdown voltage of the latter (when repeated firing deposits its metal on the ceramic) more nearly equals that of the former electrode gap breakdown. As a consequence, tubes incorporating the invention are able not only to meet more stringent overload specifications, but also to provide better stability in strike voltage to insure that after repeated operation under severe service conditions, the arrester will not be triggered by application of carrier power supply voltages and ringing potentials to the telephone lines.

SUMMARY OF THE INVENTION

The foregoing objects and advantages, and others which will be apparent in the following description or learned in the course of practicing the invention, are achieved in a three element gas tube which may be characterized as follows:

in a gas filled excess voltage protector of the type having (1) a conductive cylindrical hollow centerbody forming one electrode, (2) a pair of end caps each with a respective rod-shaped line electrode extending inwardly toward and spaced from the other in the interior of said centerbody, (3) cylindrical hollow, insulative spacers between each end of the centerbody and the adjacent end caps, the spacers each being coaxial with the respective electrode and spaced therefrom radially by a distance $g_3$, (4) the centerbody, end caps and spacers forming a hermetically sealed tube which is filled with a gas under pressure, the improvement comprising a generally cylindrical shaped sleeve coaxially disposed within the centerbody and dimensioned to provide an annular gap of dimension $g_2$ between the line electrodes and the sleeve such that the ratio $g_2/g_3$ is substantially less than 2.

BRIEF DESCRIPTION OF THE DRAWING

Serving to illustrate an exemplary embodiment of the invention is the drawing constituting an elevational, partly cross-sectional view of a preferred embodiment.

DESCRIPTION OF THE PREFERRED EMBODIMENT

Referring to the drawing the hermetically sealed gas filled enclosure of the protector is formed by two cup-shaped metal end caps 1 and 5, an intermediate metal centerbody 7 and two cylindrical hollow ceramic spacers 6, preferably formed of alumina and coated with metallized bands 6A. The cylinders 6 fit closely within the end caps 1 and 5 on the one hand and within the opposite ends of the centerbody 7 on the other hand. Metal-to-ceramic seals are formed between them, for example by brazing, which may be facilitated with the use of brazing rings (not shown).

Secured internally of the caps 1 and 2 in any convenient manner but preferably by welding, brazing or both, are respective electrodes 10 and 11 extending towards each other through the insulator spacers 6. The inner end faces of the electrodes are spaced to define a gap $g_1$ between them having a dimension appropriate to the required d.c. breakdown voltage and related tube parameters, e.g., gas type and pressure.

For permitting evacuation and subsequent gas filling, the electrode 10 may be formed with a passageway 12 into which is fitted through the end cap 1 an exhaust tube 2 which communicates with a port 13 in electrode 10 and which is closed in a hermetically sealed manner after evacuation and gas filling. The hole in end cap 1 is also sealed to the exhaust tube 2, e.g., by brazing preferably aided by the use of braze rings. The electrode 11 is similar to its opposite member 10 except that it has no exhaust tube; both are preferably formed of low carbon steel. If a tubeless gas filling operation is preferred, both electrodes may be substantially solid.

Telescopically fitted within center body 7 is a sleeve 8 which in the illustrative embodiment is of low carbon steel (e.g., C-1008); the sleeve may include a slit 7A to allow a resilient fit within centerbody 7; such a slit can be in the order of about 0.020 inches width while the sleeve wall thickness is illustratively between 0.018 and 0.022 inches, and has an axial dimension of 0.250±0.010 inches.

During assembly sleeve 8 is held in position by its own resilience but the brazing operation causes suitably placed braze material, e.g., from braze rings situated at each end of centerbody 7, to flow within or into the interface between 7 and sleeve 8 to secure them together.

The presence of insert 8 establishes gaps $g_2$ which in the illustrative embodiment are dimensioned in accordance with the desired d.c. breakdown voltage and related parameters, e.g., gas type and pressure; an exemplary value is 0.047 inches.

The inner ends of the electrodes and the inner surfaces of the sleeve 8 may carry thermionic activating material which preferably is initially applied only to the opposing faces of the electrodes 10 and 11 but becomes distributed also over the inner surface of sleeve 8 either as a result of heat applied during the process of sealing the various parts together or as a result of an aging discharge process to which the electrodes are subjected prior to being put into service.

As previously noted, the incorporation of sleeve 8 reduces the gap size $g_2$ which would otherwise exist between centerbody 7 and the line electrodes 10, 11. The gap thus more nearly approaches the spacing $g_3$ between each of the electrodes 10, 11 and its respective insulator 6.

Exemplary values of $g_2$ and $g_3$ in the predecessor design are 0.067" and 0.035", the ratio $g_2/g_3$ being nearly 2 (actually 1.91).

In the illustrated embodiment, $g_3$ remains 0.035" while $g_2$ is reduced to about 0.047"; the ratio $g_2/g_3$ is thus substantially less than 2, being about 1.34.

Consequently, should repeated triggering produce sputter-deposited metal on the surfaces 6B of the insulators 6, causing them to behave like electrodes, the strike voltage of $g_3$ will more nearly equal the rated strike voltage of the gaps $g_2$. At the same time, the presence of sleeve 8 improves the overload handling ability of the tube.

An exemplary rated d.c. breakdown voltage range for the illustrative embodiment is 300–500 VDC. For a tube with, say, a 375 VDC rating, the breakdown voltage of the ceramic/electrode gap should that occur, will be in the order of about 275 VDC. This provides a decided improvement over the predecessor design where, although the same ceramic/electrode spacing prevails, the gas pressure is lower and breakdown thus occurs at a significantly lower voltage, e.g. 230 VDC.

What is claimed is:

1. In a three electrode gas filled excess voltage protector of the type having (1) a conductive cylindrical hollow centerbody forming one electrode, (2) a pair of end caps each with a respective rod-shaped line electrode extending inwardly toward and spaced from one another in the interior of said centerbody, (3) a cylindrical hollow, insulative spacer between each end of the centerbody and the adjacent end cap, each spacer being coaxial with the respective line electrode and spaced therefrom radially by a distance $g_3$, (4) the centerbody, end caps and spacers forming a hermetically sealed tube which is filled with a gas under pressure, the improvement comprising a generally cylindrical shaped sleeve coaxially disposed within the centerbody and dimensioned to reduce the centerbody/electrode gap and thereby provide an annular gap of dimension $g_2$ between the line electrodes and the sleeve, said $g_2$ dimension substantially approaching said $g_3$ dimension, such that the ratio $g_2/g_3$ is substantially less than 2 and greater than 1, whereby the overload handling ability and the d.c. breakdown voltage stability are improved.

2. The protector as defined in claim 1 in which said ratio is about 1.3.

3. The protector as defined in claim 1 in which said gap dimension $g_2$ is about 0.05 inches.

4. The protector as defined in claim 3 in which said pressure of said gas is such that the breakdown voltage of said annular gap is in the range of 350–500 VDC.

5. The protector as defined in claim 1 in which said sleeve constitutes a separate cylindrical element brazed to said centerbody.

6. The protector as defined in claim 5 in which said sleeve includes a slit to provide resiliency.

* * * * *